United States Patent
Braun (10) Patent No.: US 9,218,897 B1
(45) Date of Patent: Dec. 22, 2015

(54) WASTEWATER TREATMENT AND RADIOACTIVE MATERIAL DISPOSAL CONTAINER

(71) Applicant: AVANTech, Inc., Columbia, SC (US)

(72) Inventor: James L. Braun, Irmo, SC (US)

(73) Assignee: AVANTech, Inc., Columbia, SC (US)

( * ) Notice: Subject to any disclaimer, the term of this patent is extended or adjusted under 35 U.S.C. 154(b) by 434 days.

(21) Appl. No.: 13/862,009

(22) Filed: Apr. 12, 2013

Related U.S. Application Data (60) Provisional application No. 61/623,240, filed on Apr. 12, 2012.

(51) Int. Cl.
| | | |
|---|---|---|
| *G21F 9/12* | (2006.01) | |
| *C02F 1/42* | (2006.01) | |
| *B01J 47/00* | (2006.01) | |
| *B01J 47/02* | (2006.01) | |
| *C02F 101/00* | (2006.01) | |

(52) U.S. Cl.
CPC ............... *G21F 9/12* (2013.01); *B01J 47/022* (2013.01); *C02F 1/42* (2013.01); *C02F 2101/006* (2013.01)

(58) Field of Classification Search
CPC . B01D 24/14; B01D 2201/307; B01J 47/022; C02F 2101/006; C02F 1/42; G21F 9/12
USPC ................ 588/7, 259; 220/62.21, 62.22, 751
See application file for complete search history.

(56) References Cited

U.S. PATENT DOCUMENTS

| | | | |
|---|---|---|---|
| 3,187,934 A * | 6/1965 | Huber | 220/495.06 |
| 4,107,044 A | 8/1978 | Levendusky | |
| 4,422,964 A | 12/1983 | Capolupo | |
| 4,625,892 A * | 12/1986 | Carlin, Jr. | 220/62.22 |
| 4,712,711 A * | 12/1987 | Geering et al. | 220/254.2 |
| 4,828,691 A | 5/1989 | Abbott et al. | |
| 4,983,282 A | 1/1991 | Roy et al. | |
| 5,026,478 A * | 6/1991 | Tanabe et al. | 210/232 |
| 5,225,114 A | 7/1993 | Anderson et al. | |
| 5,232,599 A | 8/1993 | Cole | |
| 5,770,070 A | 6/1998 | Davis et al. | |
| 6,387,274 B1 | 5/2002 | Hendricks et al. | |
| 2009/0314791 A1* | 12/2009 | Hartley et al. | 220/751 |
| 2012/0305458 A1* | 12/2012 | Jensen et al. | 210/85 |

OTHER PUBLICATIONS

"Excerpts from: ASME Boiler and Pressure Vessel Code, Section VIII—Rules for Construction of Pressure Vessels," American Society of Mechanical Engineers, 2007.

(Continued)

*Primary Examiner* — Matthew O Savage
(74) *Attorney, Agent, or Firm* — Nelson Mullins Riley & Scarborough, LLP (57) ABSTRACT

A vessel for both treatment of radioactive wastewater and disposal of radioactive waste contained therein. The vessel comprises a main vessel structure including a shell formed of a metal material and a liner integrally coupled to the interior surface of the shell. The liner is preferably formed of a plastic material, such as high density polyethylene. Waste treatment equipment for treatment of the radioactive wastewater is provided within the shell. Ion exchange resin is typically located in the main vessel structure which, when spent, constitutes the radioactive waste which is subject to disposal. The vessel is preferably configured to function as a High Integrity Container (HIC).

16 Claims, 12 Drawing Sheets

(56) References Cited

OTHER PUBLICATIONS

AVANTech, Incorporated, "A-43 High Integrity Container (A-43 HIC)," (2006) <www.avantechinc.com/downloads/high-integrty-container.pdf>.

"Application of Ion Exchange Processes for the Treatment of Radioactive Waste and Management of Spent Ion Exchangers," Technical Report Series No. 408, International Atomic Energy Agency, Vienna, Jun. 2002.

Barker, Tracy A., "Improved Techniques for Packaging Irradiated Metal Segmentation Wastes," WM '01 Conf, Tucson, Feb 25-Mar. 1, 2001.

Baxter, S.G., et al., "The Selection and Performance of the Natural Zeolite Clinoptilolite in British Nuclear Fuels' Site Ion Exchange Effluent Plant, SIXEP," Waste Management '86, vol. 2 (Proc. Int. Conf., Tucson, 1986), Board of Regents, Phoenix, 1986, pp. 347-356.

"Handling and Processing of Radioactive Waste from Nuclear Applications," International Atomic Energy Agency, Vienna, 2001.

\* cited by examiner

WASTEWATER TREATMENT AND RADIOACTIVE MATERIAL DISPOSAL CONTAINER

PRIORITY CLAIM

This application is based upon and claims the benefit of U.S. provisional application Ser. No. 61/623,240, filed Apr. 12, 2012, which is incorporated fully herein by reference.

FIELD OF THE INVENTION

The present invention relates generally to treatment and disposal of radioactive wastewater. More particularly, the invention relates to a vessel which may be used for both treatment of radioactive wastewater and disposal of radioactive waste, including but not limited to ion exchange resin.

BACKGROUND OF THE INVENTION

As is well known, radioactive materials are used extensively in industrial, medical, agricultural, and environmental activities, among others. For example, radioactive waste is generated in all stages of nuclear reactor operations, and there are a number of liquid processes and waste streams at nuclear facilities that require treatment for removal of radioactive contaminants. Management of this waste typically includes treatment, temporary storage, and transportation of the waste to a permanent disposal site.

A number of processes are available for treating liquid radioactive waste. One such process is known as ion exchange, which is effective for transferring the radioactive content of a large volume of liquid into a small volume of solid. Although ion exchange processes may be implemented in a variety of ways, the most common uses of ion exchange media are as packed beds in vessels. More particularly, an ion exchange medium is typically contained inside a stainless steel pressure vessel, with an engineered inlet, outlet, and flow distribution system to allow liquid to percolate through the bed of the medium at a specified flow rate. Many types of ion exchange media are available for this purpose, including synthetic organic resins.

Over time, however, the ion exchange medium is spent, at which point the vessel is filled with a new medium. The spent ion exchange medium is radioactive waste, and it must either be regenerated or disposed of. During disposal, the spent ion exchange medium can be dewatered or dried and is often transferred from the vessel or an intermediate storage tank to a disposal container. The disposal container, also known as a "high integrity container" (HIC), is typically formed of ductile cast iron, concrete, steel, or high density polyethylene. Alternatively, the ion exchange vessels themselves (containing the spent ion exchange media) can be removed from service and placed in polyethylene HICs for disposal.

In any event, while awaiting transport to a permanent storage/burial site, the HICs are often temporarily stored at the waste processing location. Prior art polyethylene HICs require rounded shoulders at the top and bottom to absorb shocks, and thus a metal basket or nylon straps is required to lift and move the HIC for storage. Additionally, the HICs must be stacked via tables placed between each HIC.

Finally, when the HICs are transported to a final storage/burial site, they may be placed in protective shipping casks, which may be formed of lead or steel.

SUMMARY

The present invention recognizes and addresses disadvantages of prior art constructions and methods. According to one embodiment, the present invention provides a vessel for both treatment of radioactive wastewater and disposal of radioactive waste. The vessel comprises a shell formed of a metal material and a liner integrally coupled to the interior surface of the shell. The liner is formed of a plastic material. The vessel also comprises waste treatment equipment for treatment of the radioactive wastewater provided within the shell. In some embodiments, the plastic material may be high-density polyethylene, which may be molded to the interior surface of the shell. Preferably, the vessel may be a HIC.

Those skilled in the art will appreciate the scope of the present invention and realize additional aspects thereof after reading the following detailed description of preferred embodiments in association with the accompanying drawing figures.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Embodiments of the present invention provide a vessel which may be used for both treatment of radioactive wastewater and disposal of radioactive waste, such as ion exchange media. Some embodiments of the present invention are particularly suitable for use with ion exchange processes in a nuclear wastewater treatment environment, and the below discussion will describe preferred embodiments in that context. However, those of skill in the art will understand that the present invention is not so limited. In fact, it is contemplated that embodiments of the present invention may be used for many different applications related to the treatment of radioactive waste.

Figure 1:
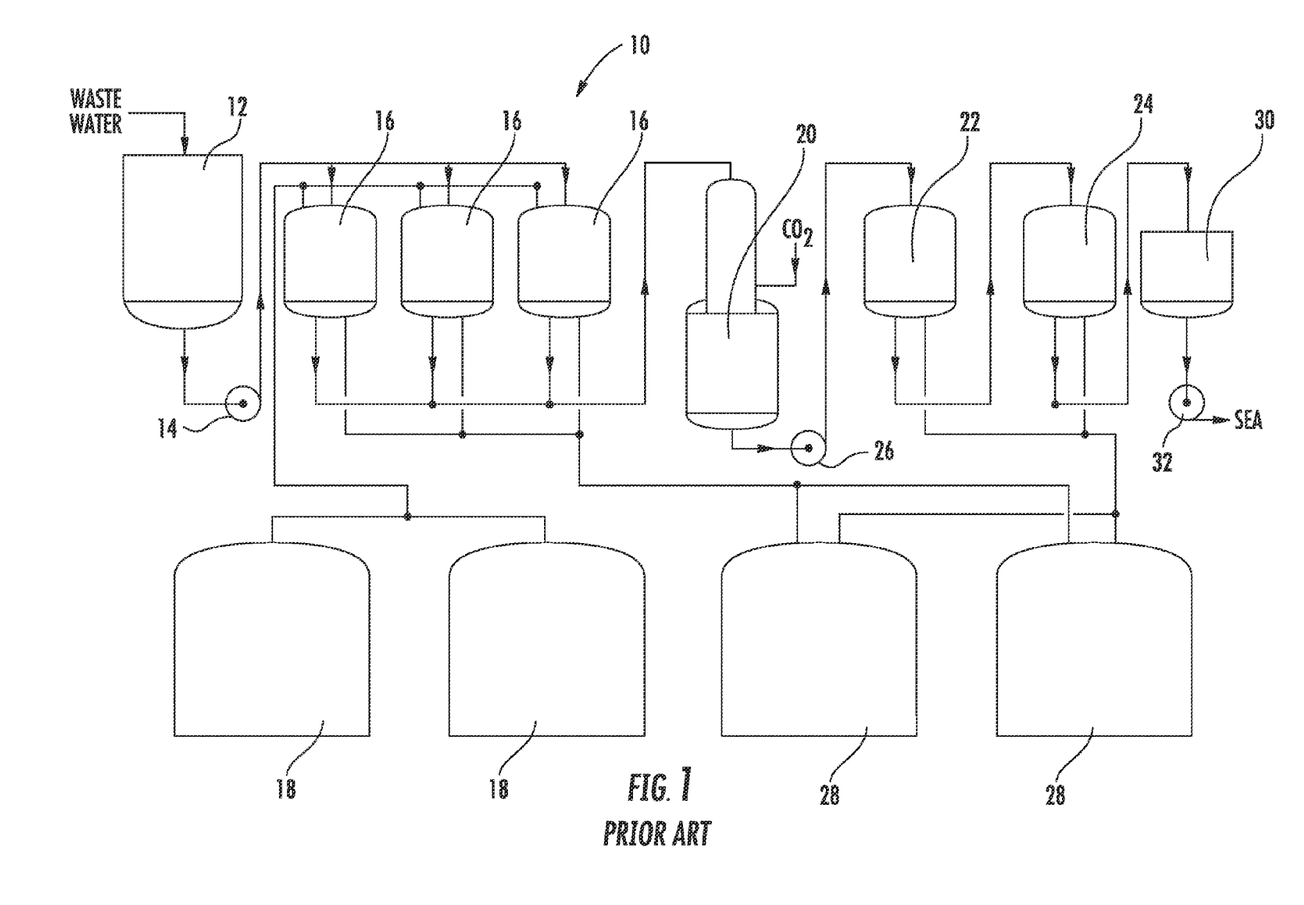
FIG. 1 is a flow diagram of an exemplary wastewater treatment process in which embodiments of the invention may be used.

In this regard, FIG. 1 is a simplified flow diagram of an exemplary wastewater treatment process 10 of the prior art which may be improved by incorporating one or more vessels in accordance with embodiments of the present invention. In particular, process 10 may be used to extract radionuclides from water used in spent nuclear fuel storage ponds. Radioactive wastewater feed may be received at a reception tank 12, from which it is pumped via pump 14 to a series of sand pressure filters 16. Sand pressure filters 16 may operate to remove fine particles of fuel corrosion sludge or other suspended solids in the feed. Such sludge may be stored in storage tanks 18. After passing through sand pressure filters 16, the wastewater feed may pass to a carbonating tower 20. Carbonating tower 20 may be used to adjust the pH of the wastewater feed using an injection of carbon dioxide.

Next, the wastewater feed is pumped to two ion exchange vessels 22, 24 via pump 26. Ion exchange vessels 22, 24, which may comprise separate beds for cation and anion exchange or which may comprise a mixed bed system, may work in series to absorb radionuclides from the wastewater feed. When the ion exchange media in vessels 22, 24 becomes spent, it is hydraulically discharged to storage tanks 28. Storage tanks 28 may also store any filter sand from pressure filters 16 which has reached the end of its useful life. After exiting ion exchange vessels 22, 24, treated water may be transferred to a final tank 30. The treated water may then be discharged via a pump 32, such as to the sea.

As explained above, in the prior art, treatment vessels for treating radioactive liquids (such as ion exchange vessels 22, 24) cannot also be used to dispose of radioactive waste, such as spent ion exchange media. In the above process, for example, the spent ion exchange media is usually transferred to high-integrity containers (HICs) from intermediate storage tanks 28 for disposal. Moreover, water treatment vessels cannot be used for shipping or storage (temporary or permanent) of radioactive waste. In contrast, embodiments of the present invention comprise a waste treatment and disposal vessel which performs these and other functions. Notably, embodiments of the present invention may eliminate the need to sluice radioactive media from a wastewater treatment vessel to a storage tank, which could potentially contaminate additional equipment as well as personnel.

Figure 2:
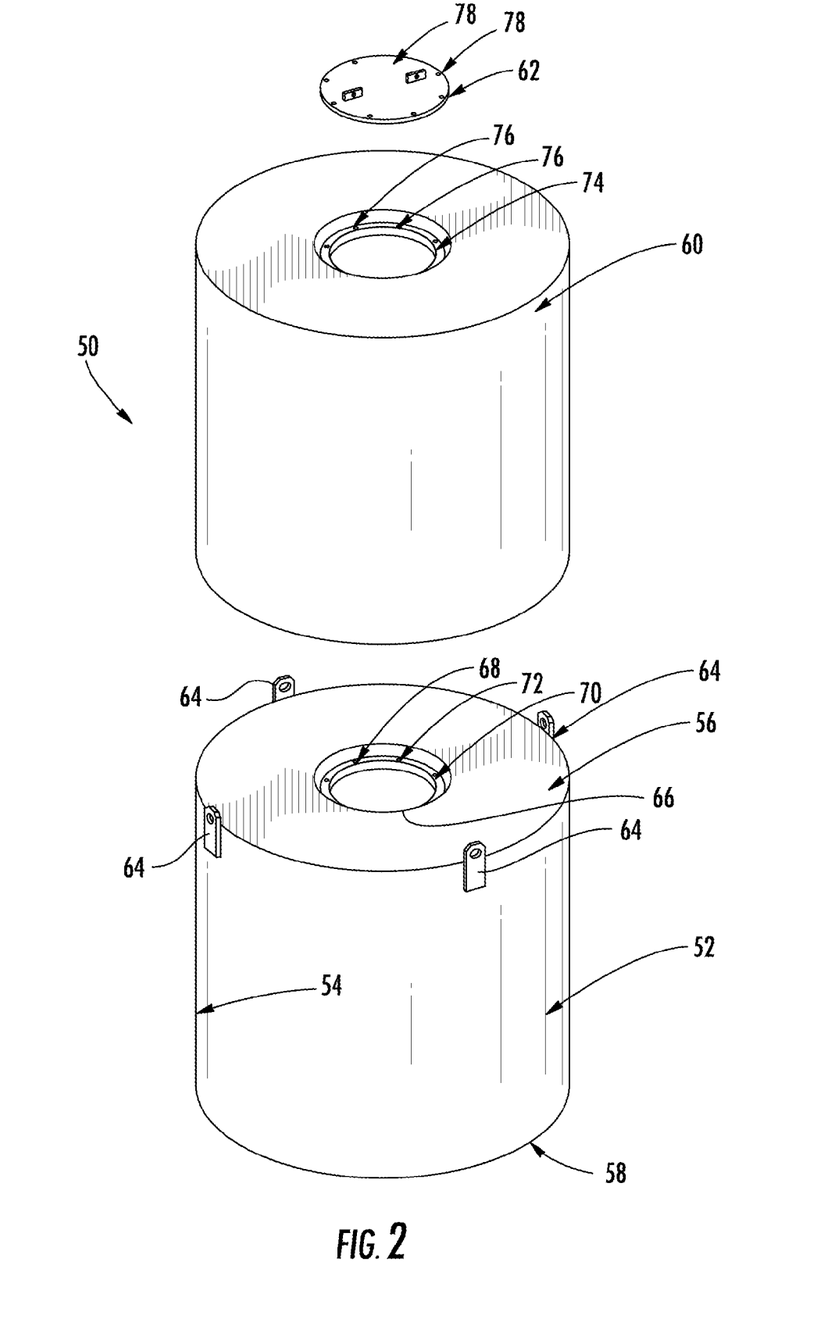
FIG. 2 is an exploded view of a waste treatment and disposal vessel constructed in accordance with an embodiment of the present invention.
Figure 3:
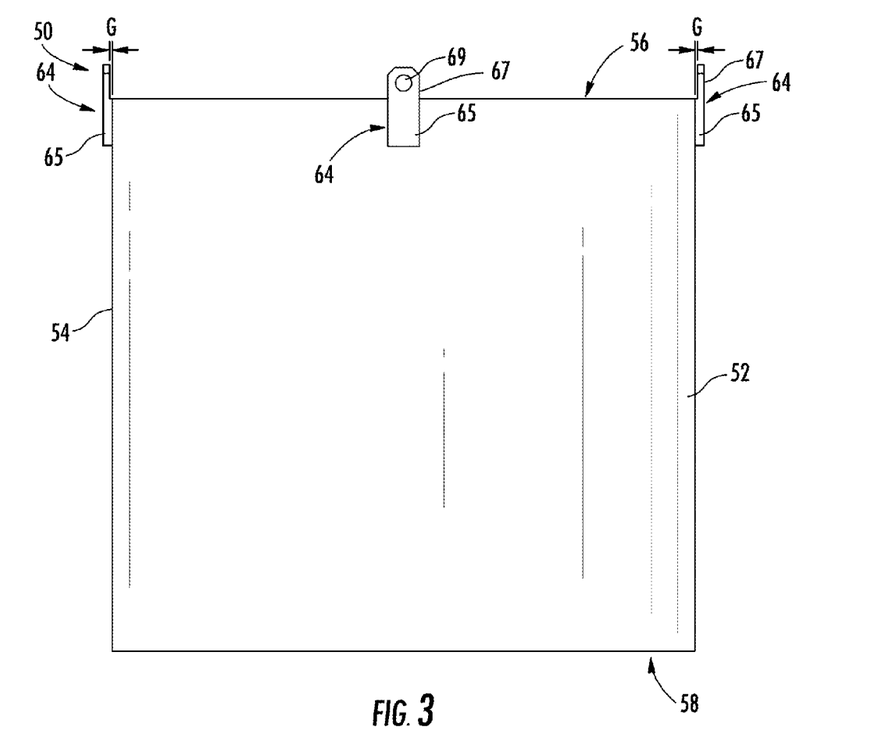
FIG. 3 is an elevation view of the waste treatment and disposal vessel of FIG. 2.

In this regard, FIG. 2 is an exploded view of a waste treatment and disposal vessel 50 constructed in accordance with an embodiment of the present invention. FIG. 3 is an elevation view of vessel 50, and FIG. 4 is a top plan view.

Figure 4:
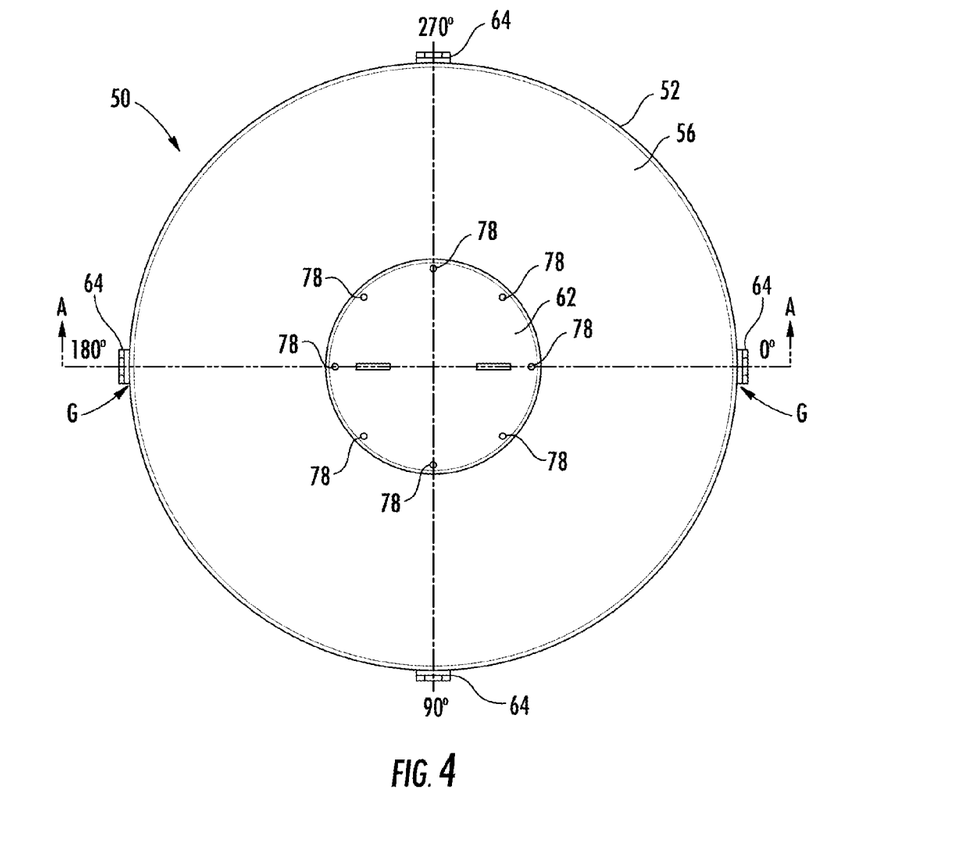
FIG. 4 is a top plan view of the waste treatment and disposal vessel of FIG. 2.

Referring first to FIGS. 2-4, vessel 50 has a main vessel structure which comprises a shell 52 including a body 54, a top 56, and a bottom 58. In the illustrated embodiment, shell 52 is cylindrical, but in other embodiments shell 52 may take any suitable shape. Vessel 50 preferably further comprises a liner 60 and a lid 62. Note that liner 60 is shown separated from shell 52 in FIG. 2 solely for purposes of illustration.

Shell 52 may preferably be formed of a suitable high-strength material such as carbon steel, stainless steel or alloy steel. For example, shell 52 may be formed via a 3-piece welded construction, wherein top 56 and bottom 58 are welded with body 54 to form shell 52, although in other embodiments top 56 and bottom 58 may be integrally formed with or attached to body 54 using any suitable method. In a preferred embodiment, shell 52 of vessel 50 is constructed to meet applicable requirements regarding the construction of pressure vessels, such as the requirements defined in the American Society of Mechanical Engineers Boiler and Pressure Vessel Code, Section VIII (incorporated herein by reference in its entirety).

As can be seen most clearly in FIG. 3, shell 52 may further comprise a plurality of lift lugs 64 having a base portion 65 coupled with body 54. As shown, for example, shell 52 comprises four lift lugs 64 disposed perpendicularly to top 56 and which are equally spaced around the circumference of body 54. Each lift lug 64 may preferably also comprise a top portion 67 which extends above top 56 of shell 52. Further, top portion 67 preferably defines a narrower width than base portion 65 such that the radial distance between the longitudinal axis of shell 52 and top portion 67 is greater than the radial distance between the longitudinal axis of shell 52 and bottom portion 65. The difference between these distances preferably defines a gap G as shown in FIGS. 3 and 4 and as discussed in more detail below. Additionally, each lift lug 64 may define an aperture 69 therethrough to facilitate the attachment of rigging for lifting and handling of vessel 50.

Figure 5A:
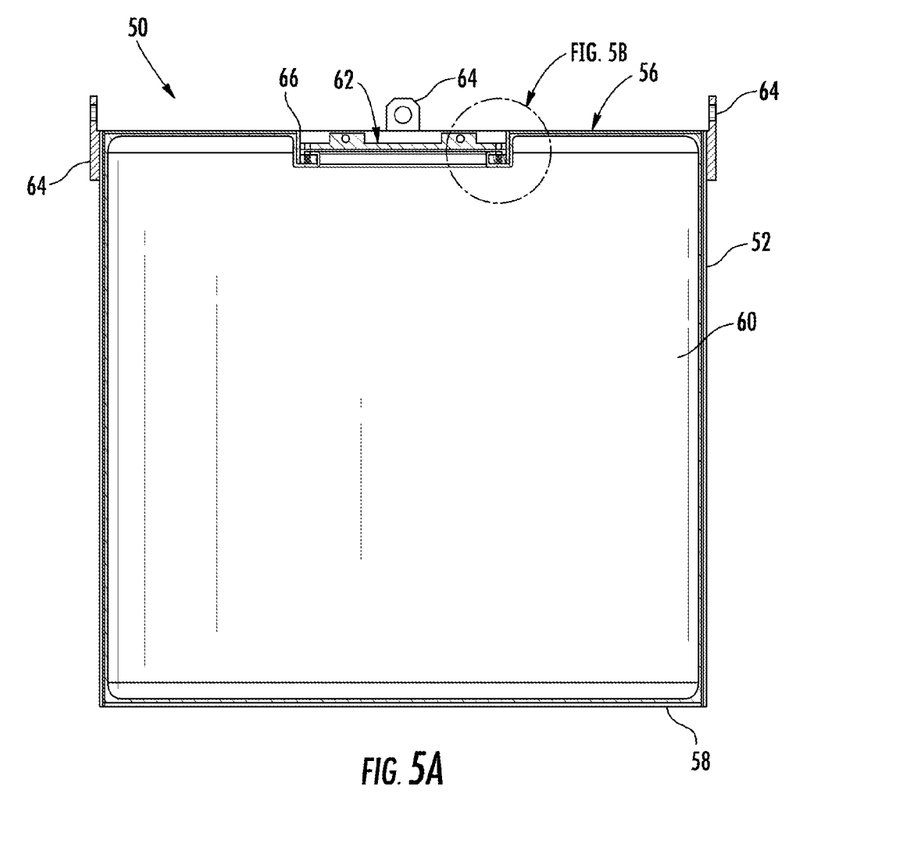
FIG. 5A is a section view of the waste treatment and disposal vessel of FIG. 2 shown along the line A-A in FIG. 4.
Figure 5B:
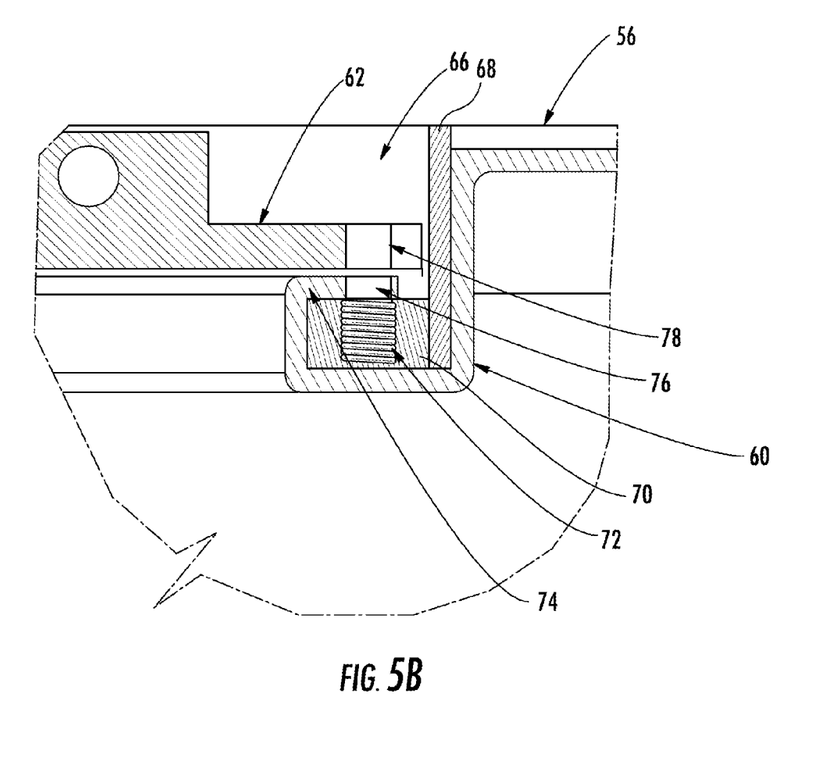
FIG. 5B is a detail view of the interface between a lid and the remainder of the waste treatment and disposal vessel as indicated in FIG. 5A.

Referring also to FIG. 5A, which is a section view of vessel 50, and FIG. 5B, which is a detail view of the interface between lid 62 and shell 52, shell 52 also preferably defines an opening 66 in top 56. Further, a rim 68 preferably depends from top 56 coincident with the circumference of opening 66. A flange 70 is preferably coupled with rim 68 and extends perpendicularly about its circumference. Flange 70 may define a plurality of apertures 72 (which, as shown, may be threaded) via which lid 62 may be coupled with shell 52.

Notably, vessel 50 is preferably a HIC. Thus, vessel 50 is preferably constructed in accordance with governmental regulations governing HICs. For example, vessel 50 preferably has sufficient mechanical strength to withstand specified horizontal and vertical loads during disposal, will withstand at least 30' drop test, allows free liquid within the container to be removed to less than 1% by volume within the container, has a design life of at least 300 years, and limits gas generation. HIC requirements are well-known to those skilled in the art and are delineated at 10 CFR 61.

Moreover, in a preferred embodiment, liner 60 is formed of a polyethylene material, such as high density cross-linked or linear polyethylene, which resists corrosion, damage from certain chemicals, and biodegradation. Notably, liner 60 may be spin-molded or rotomolded in shell 52 such that it tightly adheres to the interior of shell 52. Those of skill in the art will appreciate that other methods of manufacturing liner 60 are within the scope of the present invention, including injection molding and heat welding, among others.

Because liner 60 may be molded to the interior of shell 52, the thickness of liner 60 may be less than that of standalone polyethylene HICs, which may have a wall thickness of ½".

For example, in one embodiment, liner 60 may define a thickness of ⅜" or less. Additionally, because large, rounded shoulders are not required for liner 60 (as they may be with standalone HICs) and because liner 60 is manufactured to tightly adhere to the interior of shell 52, liner 60 (and thus, vessel 50) may store a larger volume of waste than a traditional HIC of the same diameter and height.

Similar to liner 60, lid 62 is preferably formed of a polyethylene material, although other suitable materials may be used. In one embodiment, lid 62 may define threads which engage corresponding threads on rim 68 or flange 70 of shell 52. In other embodiments, lid 62 may be heat welded with liner 60. In another embodiment, as shown in FIGS. 2 and 5A-5B, liner 60 may preferably define a lip 74 which at least partially surrounds flange 70 of shell 52. Lip 74 defines apertures 76 aligned with apertures 72 of flange 70. Similarly, lid 62 preferably defines apertures 78 aligned with apertures 76, 72. Thereby, lid 62 may also be secured with shell 52 and liner 60 via suitable fasteners. In some embodiments, a gasket material may be provided in apertures 78 or between lid 62 and lip 74.

In any event, the mechanism by which lid 62 is secured with shell 52 and liner 60 preferably facilitates simple, rapid installation and removal, either manually or using remote and/or automated tooling. Moreover, lid 62 may include a passive vent or filter to prevent overpressurization of vessel 50. According to a further embodiment, vessel 50 may include a cover over lid 62. The cover may be coupled with opening 66 in top 56 of shell 52 and may preferably be formed of carbon steel. It will be appreciated that the carbon steel material of shell 52 and the cover (if provided) provides a measure of fire resistance to vessel 50.

Figure 6:
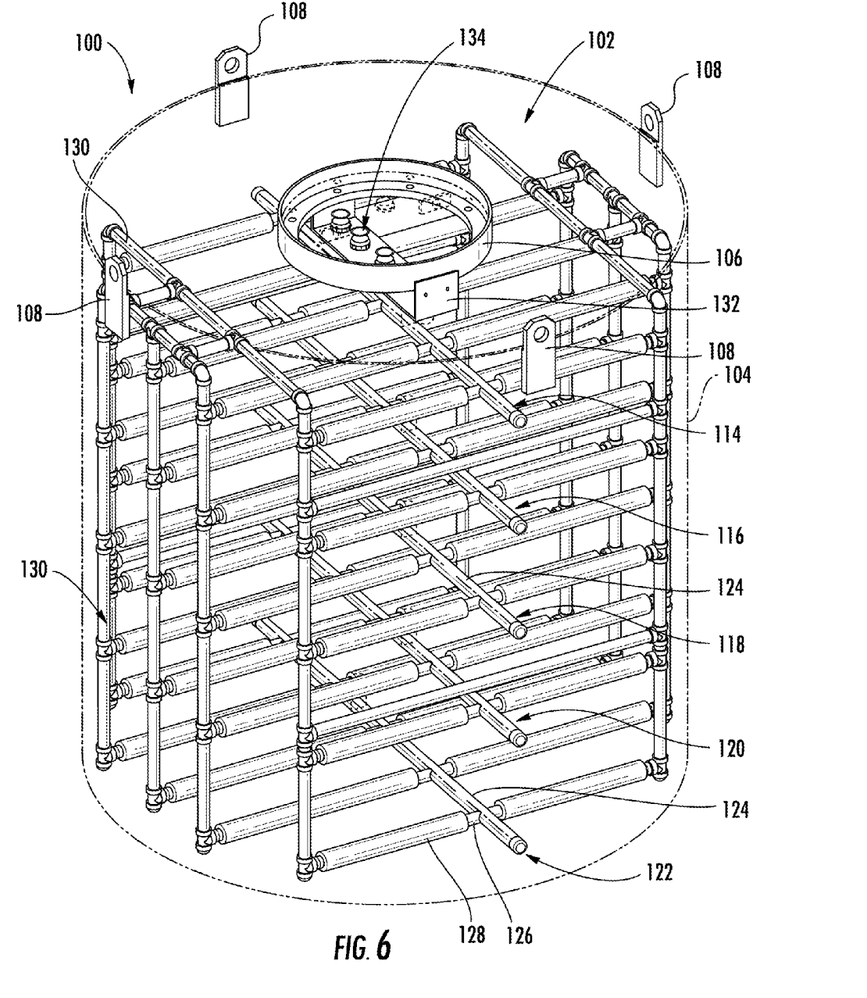
FIG. 6 is an isometric view showing exemplary internal waste treatment equipment contained within a waste treatment and disposal vessel constructed in accordance with an embodiment of the present invention.
Figure 7:
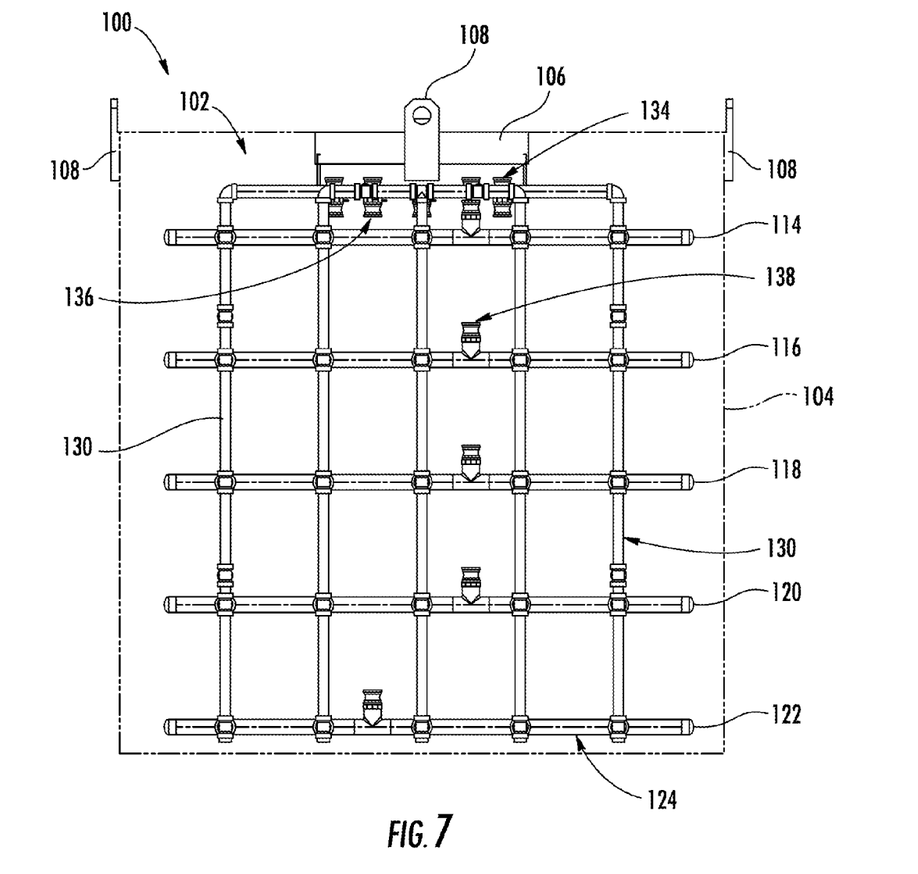
FIG. 7 is an elevation view of the waste treatment and disposal vessel of FIG. 6.
Figure 8:
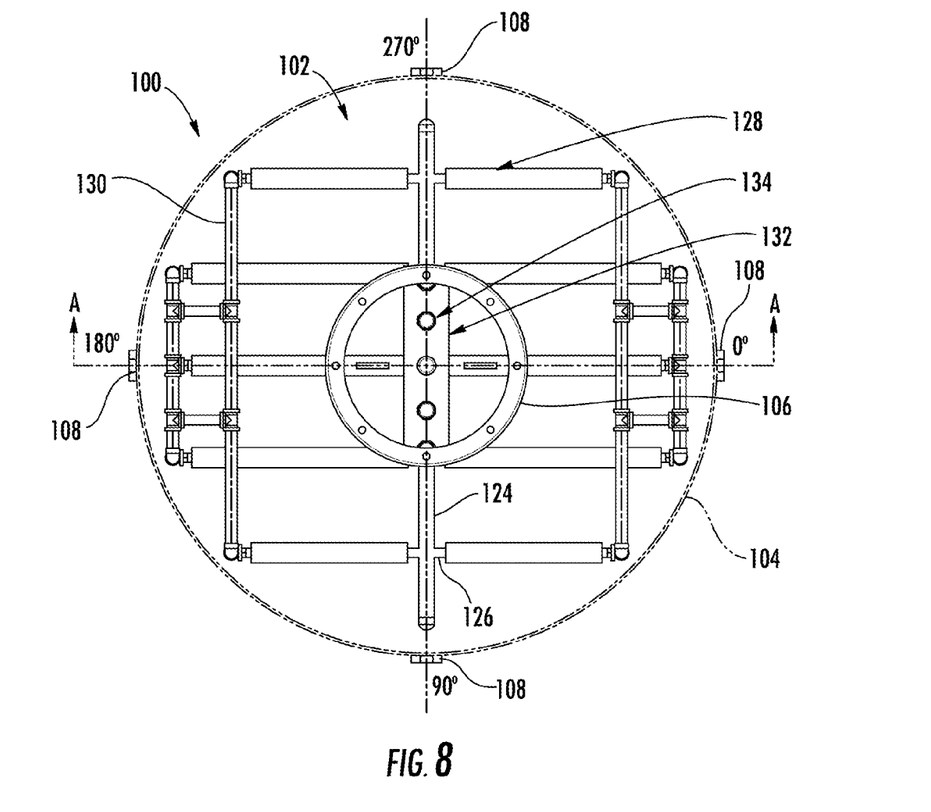
FIG. 8 is a top plan view of the waste treatment and disposal vessel of FIG. 6.
Figure 9:
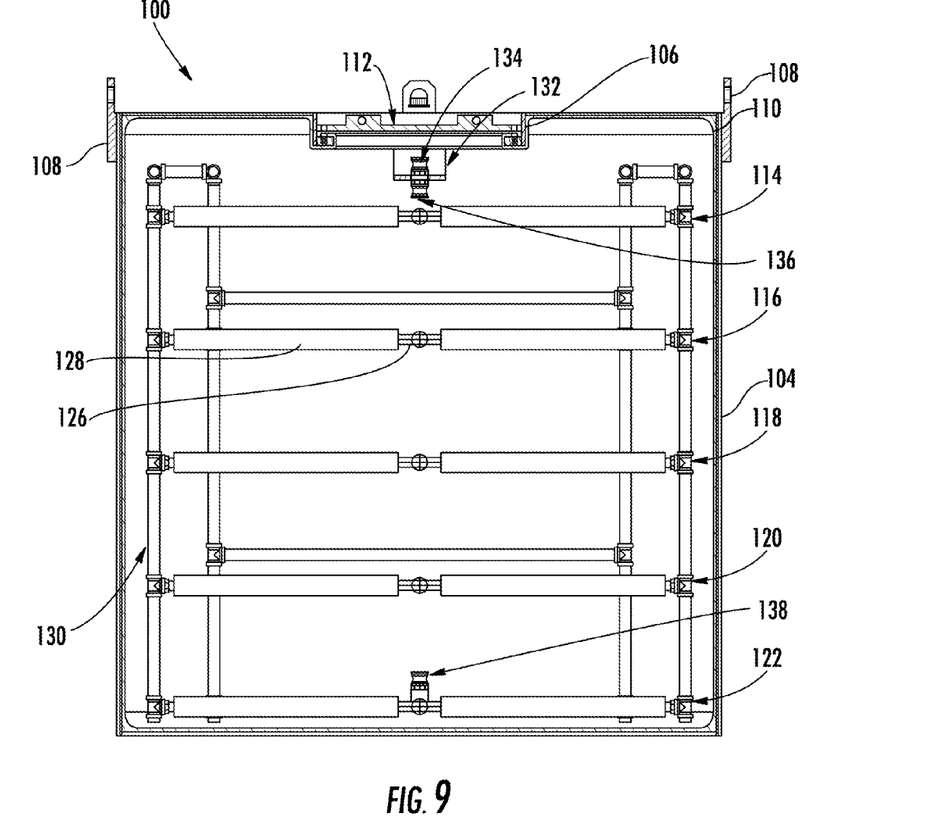
FIG. 9 is a section view of the waste treatment and disposal vessel of FIG. 6 shown along the line A-A in FIG. 8.

Embodiments of the present invention are preferably compatible with and may include waste treatment equipment, such as piping suitable for use in an ion exchange vessel. In this regard, one example of waste treatment equipment which may be used with some embodiments of the present invention is discussed below with reference to FIGS. 6-9. FIG. 6 is an isometric view of a waste treatment and disposal vessel 100 in accordance with the present invention that includes internal waste treatment equipment 102. Vessel 100 may preferably be analogous to vessel 50 described above and thus may comprise a shell 104, a rim 106, and lift lugs 108. FIGS. 7-9 are respective elevation, plan, and section views of vessel 100. As shown in FIG. 9, vessel 100 also preferably includes a liner 110 and a lid 112. In FIGS. 6-8, shell 104 of vessel 100 is shown in broken lines to facilitate illustration of waste treatment equipment 102.

More particularly, in the illustrated embodiment waste treatment equipment 102 may comprise a plurality of filter layers 114, 116, 118, 120, and 122. Depending on the waste treatment process involved, those of skill in the art will appreciate that more or fewer than five filter layers may be provided. Each filter layer preferably comprises a manifold 124 which extends transversely across the interior of shell 104.

In fluid communication with and extending normally from each manifold 124 are a plurality of conduits 126. As shown, each manifold 124 is in fluid communication with ten such conduits 126, although this number may vary depending on the application, as noted above. Conduits 126 may preferably be configured to introduce influent evenly across the transverse area of the interior of shell 104. Further, conduits 126 may each comprise a filter element 128 to capture undissolved solids in the influent and effluent. In one embodiment, filter elements 128 may comprise a 0.5 μm depth filter.

Supporting each of filter layers 114-122 is a support structure 130. As shown, support structure 130 is a frame-like structure which may rest on the bottom of the interior of shell 104. Also, support structure 130 may be coupled with the terminal ends of each conduit 126. In a preferred embodiment, support structure 130 may be formed of a lightweight plastic material suitable for use in a waste treatment environment, such as PVC. In other embodiments, however, support structure 130 may be formed of steel.

Waste treatment equipment 102 may further comprise a connection plate 132 (FIG. 9) for facilitating connections between each filter layer 114-122 and external equipment. Connection plate 132 may comprise a transverse plate coupled with and depending from rim 106. Connection plate 132 includes a plurality of upper connectors 134 and lower connectors 136 equally spaced along its length. In one embodiment, connectors 134, 136 may comprise camlock fittings. Preferably, the number of upper and lower connectors 134, 136 corresponds to the number of filter layers of waste treatment equipment 102. Thus, as shown, five each of upper and lower connectors 134, 136 are provided. Notably, upper connectors 134 are located below the opening so that they will not interfere with attachment of the lid in the manner described above.

Correspondingly, each filter layer 114-122 may comprise a connector 138 in fluid communication with each manifold 124. Connectors 138 may likewise comprise camlock fittings. A hose may be releasably connected between the connector 138 of each filter layer 114-122 and one of lower connectors 136 to provide fluid communication between external equipment connected to each upper connector 134 and each filter layer 114-122. Similarly, external equipment, such as a fillhead or a dewatering pump, may comprise one or more hoses which releasably couple with upper connectors 134. Those of skill in the art are familiar with hoses suitable for waste treatment processes.

Based on the above, waste treatment equipment 102 may be used for a number of different waste treatment processes. For example, waste treatment equipment 102 may be used in an ion exchange process to treat radioactive wastewater. In this case, vessel 100 may include a bed of ion exchange material. A fillhead may be coupled with one or more of upper connectors 134 to introduce wastewater into vessel 100 at a predetermined flow rate. Via hoses extending between lower connectors 136 and connectors 138 on one or more of filter layers 114-120, the wastewater may be distributed over the bed of ion exchange material. Filter layer 122, located at the bottom of shell 104, may be used to capture effluent, which then passes via a hose to a lower connector 136 and upper connector 134. Treated effluent then exits vessel 100.

Those of skill in the art will appreciate that other embodiments of the present invention may include additional or different waste treatment equipment and may be used with different waste treatment processes than those mentioned above. For example, vessel 100 may be used as a filter to remove undissolved solids from a waste stream. Alternatively, waste treatment equipment 102 may be used in a "buffering" or "bulk" ion exchange treatment process, wherein used or partially spent media which retains some capacity for ion exchange is sluiced into vessel 100. In this process, the partially spent media may form a portion of a waste feed which also comprises a large amount of water, and thus an upper filter layer, such as filter layer 114, may be used to decant the water as the media is sluiced into vessel 100. After a predetermined amount of partially spent media is introduced into vessel 100, wastewater may be flushed through the media as discussed above as an initial or final treatment process.

Further, waste treatment equipment 102 may be used in a dewatering process to remove water from radioactive waste in vessel 100 prior to storage or shipment. For example, dewatering equipment may be connected with one or more of upper connectors 134. Depending on the application, dewatering equipment may include a source of compressed air or a dewatering vacuum pump, as those of skill in the art are aware.

Figure 10:
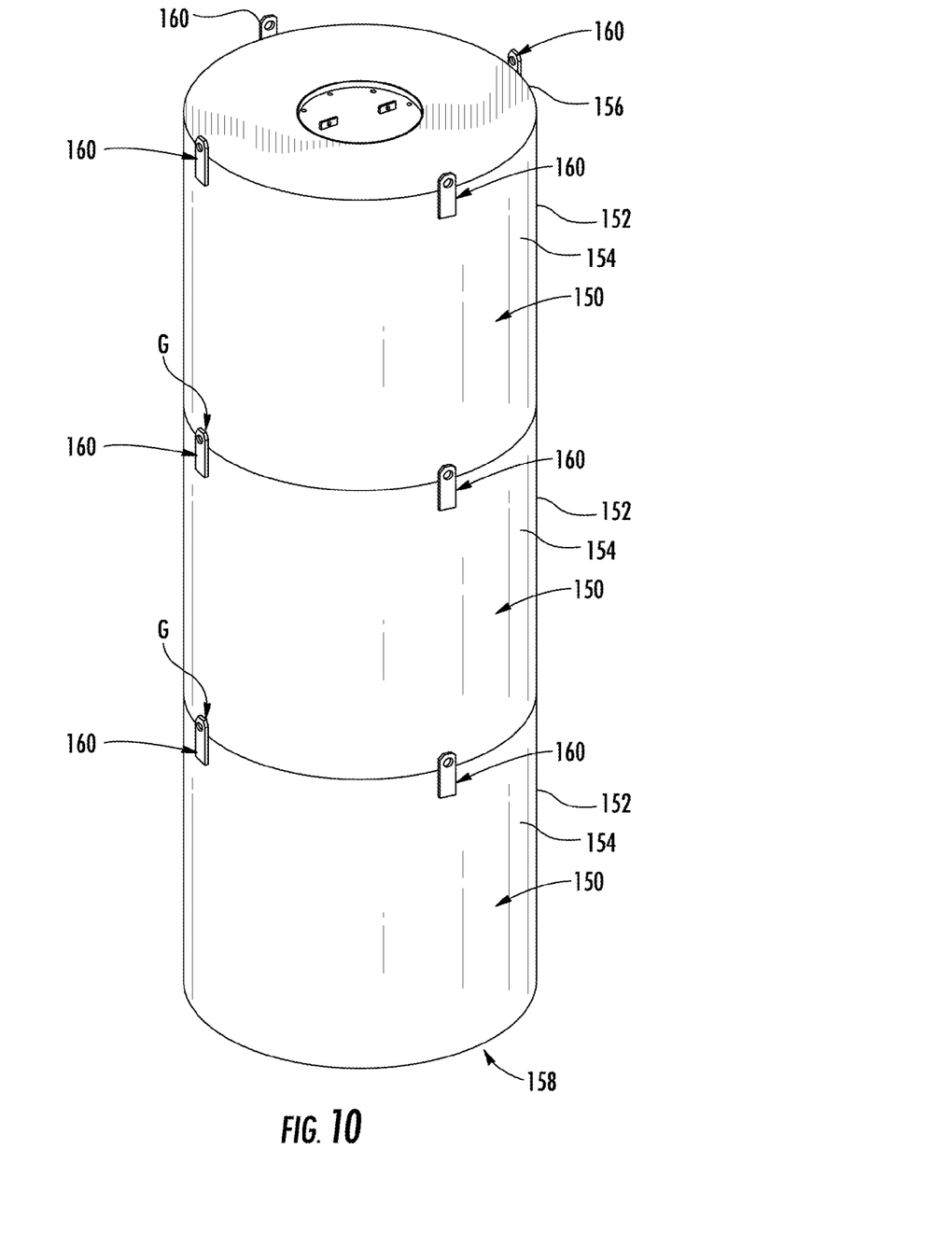
FIG. 10 is a perspective view of three waste treatment and disposal vessels constructed in accordance with an embodiment of the present invention which have been stacked for temporary storage.
Figure 11:
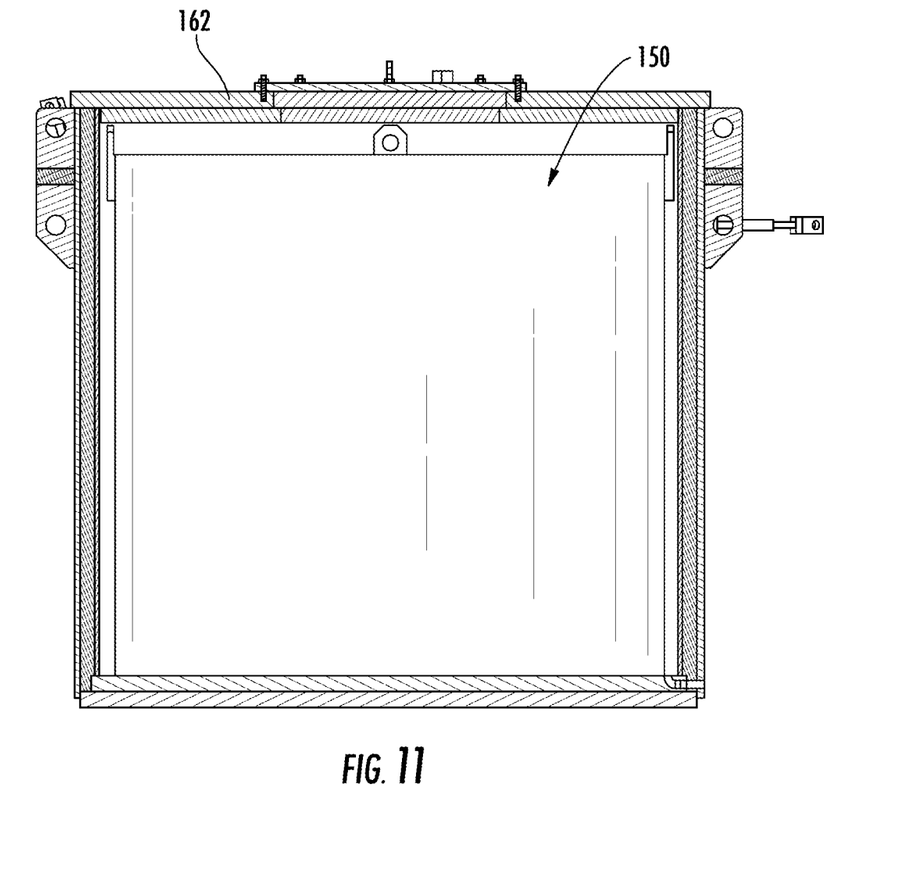
FIG. 11 is a section view of a shipping cask into which a waste treatment and disposal vessel constructed in accordance with an embodiment of the present invention has been placed.

Referring now to FIGS. 10-11, and as noted above, embodiments of the present invention comprise features which facilitate storage and transport of waste treatment and disposal vessels 150. Waste treatment and disposal vessels 150 are preferably analogous to vessels 50, 100 discussed above. Thus, vessels 150 preferably comprise a shell 152 having a body 154, a top 156, and bottom 158. Further, vessels 150 preferably comprise a plurality of lift lugs 160 defining a gap G.

Lift lugs 160 are preferably constructed to accommodate the maximum allowable load of vessels 150, which allows vessels 150 to be lifted and stacked even when full. Also, vessels 150 are preferably constructed to have a mating configuration between the top 156 of one vessel 150 and the bottom 158 of another vessel 150 to facilitate stacking. Lift lugs 160 may act as a guide during the stacking process. Further, because vessels 150 are constructed to meet applicable requirements regarding the construction of pressure vessels, vessels 150 may be stacked at least 3 high (as shown in FIG. 10). Finally, gap G of lugs 160 allows lugs 160 to be used to tie down vessels 150 even when vessels 150 are stacked.

Additionally, vessels 150 are preferably constructed in accordance with applicable governmental regulations and requirements regarding shipping of radioactive material. For example, in one embodiment vessels 150 may be a Type A Shipping Package. Correspondingly, vessels 150 may be sized to fit within various-sized transport casks 162. As those of skill in the art are aware, casks 162 may be placed on a truck for transport to a disposal or burial site. After arrival at the site, vessel 150 may be removed from cask 162 for burial.

Thus, embodiments of the present invention provide a high-integrity container capable of both treating radioactive wastewater and disposing of radioactive waste, including meeting applicable regulations for shipping and storage of such waste. Moreover, as explained above, sluicing or transferring waste media from a wastewater treatment vessel can be hazardous, can cause personnel radiation exposure or other safety concerns, and may cause expensive repairs. Importantly, however, in embodiments of the present invention it is not necessary to sluice or transfer waste media from the wastewater treatment vessel.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A vessel for both treatment of radioactive wastewater and disposal of radioactive waste contained therein, said vessel comprising:
    a main vessel structure including a shell that defines an interior surface, wherein the shell includes a top defining a top opening therein, said top opening adapted to receive and be closed by a lid when said main vessel structure is being used for disposal of the radioactive waste, wherein said shell is formed of a metal material;
    a liner integrally coupled to the interior surface of said shell, said liner being formed of a plastic material and defining an interior space within said shell;
    waste treatment equipment for treatment of said radioactive wastewater provided within said shell; and
    at least one connector for connecting said waste treatment equipment to an external pipe located outside of said main vessel structure, wherein said at least one connector has an open end for removable connection to an open end of the external pipe, and wherein said open end of said at least one connector is located within said interior space and is positioned proximate to and below said top opening, whereby said at least one connector is accessible through said top opening for connection to said external pipe when said vessel is being used for treatment of radioactive wastewater.

2. The vessel of claim 1, further comprising a bed of ion exchange resin located inside said interior space, wherein said ion exchange resin, when spent, constitutes said radioactive waste which is subject to disposal.

3. The vessel of claim 1, wherein said metal material is stainless steel.

4. The vessel of claim 1, wherein said plastic material of said liner comprises high-density polyethylene.

5. The vessel of claim 4, wherein said liner is molded to the interior surface of said shell.

6. The vessel of claim 1, wherein said liner is molded to the interior surface of said shell.

7. The vessel of claim 6, wherein said liner has a thickness of no greater than approximately ⅜ inch.

8. The vessel of claim 1, wherein said shell further comprises a body and a bottom.

9. The vessel of claim 8, wherein said top and said bottom of said shell are substantially planar and parallel to each other.

10. The vessel of claim 9, wherein said body is cylindrical.

11. The vessel of claim 9, further comprising a plurality of lift lugs attached to said body at spaced apart locations about a circumference thereof, said lift lugs extending above said top.

12. The vessel of claim 1, further comprising
    a lid attachable to said shell and configured to cover said top opening.

13. The vessel of claim 12, wherein said waste treatment equipment includes a piping network disposed within said interior space, said piping network connected to said at least one connector to direct a flow of radioactive wastewater through said waste treatment equipment.

14. The vessel of claim 13, wherein said at least one connector includes at least one inflow connector having an open end for removable connection to an open end of an external inflow pipe and at least one outflow connector having an open end for removable connection to an open end of an external outflow pipe.

15. The vessel of claim 14, wherein said inflow connector and said outflow connector are accessible via said top opening defined in said top of said shell.

16. The vessel of claim 15, wherein the open end of said inflow connector and the open end of said outflow connector are positioned within said interior space so as not to interfere with placement of said lid.

* * * * *